Byron Sloper

Air Gas Apparatus.

REISSUED JUL 18 1871

4476

Witnesses.

Jos L Coombs

J. J. Coombs

Inventor

Byron Sloper

By Chas. L. Coombs

Attorney

UNITED STATES PATENT OFFICE.

BYRON SLOPER, OF ST. LOUIS, MISSOURI.

IMPROVEMENT IN APPARATUS FOR CARBURETING AIR.

Specification forming part of Letters Patent No. 115,988, dated June 13, 1871; reissue No. 4,476, dated July 18, 1871.

*To all whom it may concern:*

Be it known that I, BYRON SLOPER, of St. Louis, in the county of St. Louis and State of Missouri, have invented a new and useful Improvement in Air Gas-Lamps, of which the following is a full, clear, and exact description.

The nature of my invention relates to that class of gas-machines known as gravity-machines; and it consists in so arranging and constructing the carbureter, in connection with an automatic valve for admitting and shutting off the air, that said carbureter may be heated without any liability of the gas to escape from the carbureter and endanger the apartment in which it is placed by the formation of an explosive mixture.

The gravity machines heretofore constructed have proved defective and dangerous for the reason that the gas would escape from the air-inlet aperture when the apparatus was idle, and it was also impracticable to use heat in connection with such apparatus for the reason that it would increase the volume of vapor in the carbureter to such an extent that it would overflow though the air-inlet when the machine was in use, and thus endanger all surrounding objects, by the formation of an explosive mixture in the room in which it was placed. Besides, when the machines heretofore employed were not in use, the gasoline would be constantly evaporating and escaping into the room through the air-inlet, thus giving rise to offensive odors. It is of the utmost importance, in most instances, to apply heat to the carbureter in order to be enabled to use oils of a low gravity where the high-gravity hydrocarbons cannot be obtained, and also to use the high gravity of oils in cold weather, which do not readily volatilize at low temperatures; and also it is an object of importance for the reason that, under all circumstances, by the aid of heat, the air will be much more highly carbureted, and thus the danger of forming explosive mixtures in the apparatus rendered less likely, since such mixtures are only formed when the air is lightly carbureted. Again, it is absolutely necessary to employ heat when the apparatus is used as a lamp, where only a short fall can be obtained, as the vapor under ordinary circumstances does not possess sufficient gravity to give a sufficient light. For the above reasons all former apparatus have proved defective and impracticable; but by my invention all these difficulties are overcome.

Figure 1:
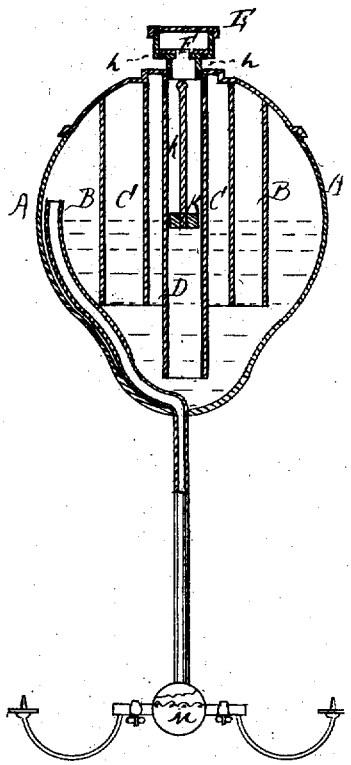
Figure 2:
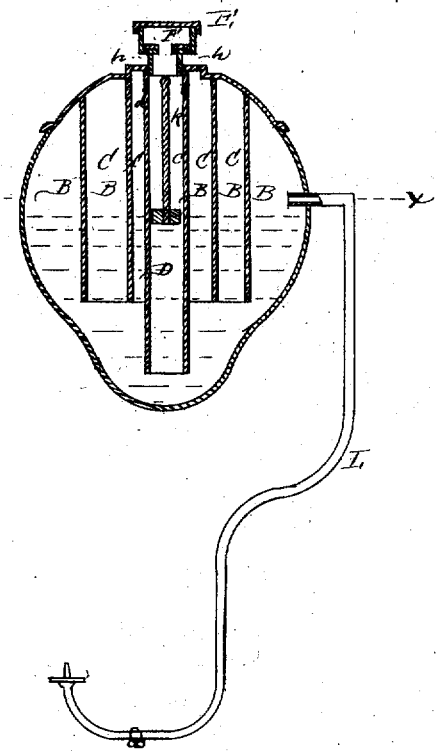
Figure 3:
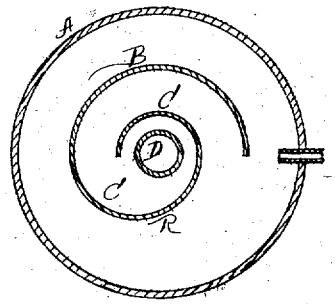
Figure 4:
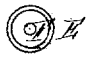
Figure 5:
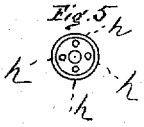

In the drawing, Figures 1 and 2 represent vertical sections of my apparatus; Fig. 3, a sectional view on line *x x* of Fig. 2; Fig. 4, a view of the valve-box with the top removed, showing the valve; and Fig. 5, a view of the valve-box, showing the valve-seat.

A represents a vessel or carbureter of any suitable shape or material, in the upper part of which is secured a convolute partition, B, forming a winding passage, C, which is filled with curled hair, excelsior, or other suitable material. Said partition is secured to the top of the carbureter, and its lower edge extends to near the bottom, so as to be covered by or immersed in the hydrocarbon liquid when the carbureter is charged. Extending from the top of the vessel B down through its center is a tube, D, which terminates near the bottom of said vessel, and to the upper end of which is attached, by means of a screw-thread or otherwise, a valve-cap, E, in which the automatic valve F works. Said automatic valve consists of an annular disk, the aperture through which comes directly over the opening or tube communicating with the carbureter. Said valve rests on an annular valve-seat, H, formed by the bottom of the valve-box or cap E, through which is made a series of apertures, *h h*, establishing a communication with the interior of the valve-box and the atmospheric air when the valve rises from its seat. Over these apertures the annular valve rests, and prevents communication with the atmosphere when the apparatus is not in use, and the escape of gas when there is any pressure from within by expansion. Near the top of the tube D is an aperture, *d*, opening into the center of the winding passage C, and providing an inlet for air, which passes from the center of said passage to its outer edge, becoming carbureted in its course, and escaping into the service-pipe L, which extends from said carbureter at a point above the level of the hydrocarbon liquid and terminates in proper burners below. These burners are arranged so as to come beneath the carbureter in order to heat it, or the carbureter may be heated in any other convenient manner. Between said burners and the carbureter, in the service-pipe, is placed a packing of wire or wire-gauze, or other suitable material, M, which acts upon the principle of the safety-lamp and prevents any back flow of flame to the carbureter. In the tube H is placed a float, K, attached to a rod, *k*, extending up into said tube, which indicates when the proper quantity of hydrocarbon liquid has been poured into the apparatus when filling.

To put the apparatus in operation, the valve-cap is removed and the hydrocarbon liquid poured in until the valve-rod rises to the top of the tube D. The valve-cap is then replaced, and the cock at the burner turned so as to open communication with the carbureter. The vapor in the carbureter falls by its own gravity through the service-pipe and issues at the burner, where it may be lighted, at the same time causing a partial vacuum in the carbureter, which causes the air to raise the automatic valve and enter the carbureter through the valve-box and tube.

The heat applied to the carbureter causes the hydrocarbon more readily to evaporate and mix with the air, thus increasing its specific gravity, and rendering a less fall in the service-pipe necessary for the proper light, enabling me to apply my invention to a chandelier or ordinary lamp.

What I claim is—

1. An air-gas chandelier or lamp, provided with an automatic valve for admitting and shutting off the air so that the carbureter may be heated, as and for the purposes specified.

2. The carbureter A, in combination with the automatic valve F, as and for the purpose described.

BYRON SLOPER.

Witnesses:
JOS. L. COOMBS,
EDM. F. BROWN.